United States Patent [19]
Bassler et al.

[11] Patent Number: 5,136,999
[45] Date of Patent: Aug. 11, 1992

[54] FUEL INJECTION DEVICE FOR INTERNAL COMBUSTION ENGINES

[75] Inventors: Helmut Bassler, Weinstadt; Thomas Naeger, Stuttgart, both of Fed. Rep. of Germany

[73] Assignee: Robert Bosch GmbH, Stuttgart, Fed. Rep. of Germany

[21] Appl. No.: 646,797

[22] PCT Filed: May 14, 1990

[86] PCT No.: PCT/DE90/00345
§ 371 Date: Jan. 31, 1991
§ 102(e) Date: Jan. 31, 1992

[87] PCT Pub. No.: WO90/15240
PCT Pub. Date: Dec. 13, 1990

[30] Foreign Application Priority Data
Jun. 6, 1989 [DE] Fed. Rep. of Germany ....... 3918410

[51] Int. Cl.⁵ .............................................. F02M 39/00
[52] U.S. Cl. .................................. 123/470; 123/456
[58] Field of Search ............... 123/470, 472, 468, 469, 123/456

[56] References Cited

U.S. PATENT DOCUMENTS

| | | | |
|---|---|---|---|
| 4,294,215 | 10/1981 | Hans | 123/470 |
| 4,474,160 | 10/1984 | Gartner | 123/468 |
| 4,570,602 | 2/1986 | Atkins | 123/456 |
| 4,823,754 | 4/1989 | Minamoto | 123/468 |
| 4,899,712 | 2/1990 | De Bruyn | 123/456 |
| 4,984,548 | 1/1991 | Hudson | 123/470 |
| 4,991,557 | 2/1991 | DeGrace | 123/470 |
| 4,993,390 | 2/1991 | Ono | 123/456 |
| 5,035,224 | 7/1991 | Hornby | 123/456 |
| 5,038,738 | 8/1991 | Hafner | 123/456 |
| 5,040,512 | 8/1991 | Twilton | 123/468 |

FOREIGN PATENT DOCUMENTS

| | | | |
|---|---|---|---|
| 0385820 | 9/1990 | European Pat. Off. | 123/470 |
| 3014066 | 10/1981 | Fed. Rep. of Germany | 123/470 |

*Primary Examiner*—Carl S. Miller
*Attorney, Agent, or Firm*—Edwin E. Greigg; Ronald E. Greigg

[57] ABSTRACT

A fuel injection device for internal combustion engines having a fuel distributor which bears a multiplicity of connecting pieces with radially protruding locking collars and a multiplicity of fuel injection valves constructed as so-called top-feed valves, said fuel injection valves being inserted liquid-tightly into the connecting piece. For the purpose of fixing each of the fuel injection valves in the axial direction as well as for securing the fuel injection valves against rotation in the circumferential direction, in each case a connecting element is provided which engages in an annular groove in the valve housing and engages over the locking collar. In addition, the connecting element has two fixing elements which engage in a positive-locking manner around, in each case, one of the molded elements at least in the circumferential direction, said molded elements being mounted in a defined position on the valve housing and on the connecting piece.

20 Claims, 6 Drawing Sheets 5,136,999

FUEL INJECTION DEVICE FOR INTERNAL COMBUSTION ENGINES

PRIOR ART

The invention is based on a fuel injection device for internal combustion engines as set forth hereinafter.

In a known fuel injection device of this kind (DE 34 28 597 C2), the connecting element is constructed as a U-shaped spring clip, the web of which extends transversely to the longitudinal extension of the fuel injection valve and the legs of which engage a circumferential groove on the valve housing of the fuel injection valve with tabs which are bent radially inwards on the edge, and have openings into which the locking collar on the connecting piece can be engaged. For radial fixing of the spring clip in the circumferential groove of the valve housing, the tabs have circular arc-shaped, concavely extending sections, the radius of which corresponds to that of the circumferential groove. When mounting, the spring clip is first pushed onto the fuel injection valve, the legs engaging with their tabs into the circumferential groove. Then, the fuel injection valve provided with the spring clip is pushed axially into the connecting piece. In order that the legs can slide over the locking collar, they are angled off outwardly in the insertion direction and are spread out, when inserted, by the locking collar. As soon as the locking collar is engaged in the openings, the legs spring back into their initial position.

Although an axial securing of the fuel injection valves against unintended pulling off of the fuel distributor is provided in such a fuel injection device, there is no securing against rotation of the fuel injection valves in the circumferential direction, as can occur, for example, when mounting or plugging on or pulling off the connecting cables for the fuel injection valves. When using so-called multi-jet fuel injection valves, however, an exact positioning of the individual jet planes of the fuel injection valves is required for the induction geometry of the internal combustion engine which cannot be changed; since any deviation from this position due to rotation in the circumferential direction leads to a worsening of the mixture preparation.

ADVANTAGES OF THE INVENTION

The fuel injection device according to the invention has the advantage that the fuel injection valves inserted in the connecting pieces and held by means of the connecting elements are installed accurately, with tolerances, in the circumferential direction and a rotation due to simple action of forces from outside, e.g. as a result of plugging on or pulling off the connecting cables is no longer possible. The connecting elements can be produced easily and permit easy and automatic mounting. The moulded elements on the fuel injection valves and on the connecting pieces can already be allowed in the form of a tool and do not lead to appreciable additional production costs. The correct positioning of the fuel injection valves in respect of the induction geometry of the internal combustion engine can also be reproduced with a high degree of accuracy after disassembly for servicing purposes and is reliably maintained even under rough operating conditions.

By means of the measures disclosed herein, advantageous further developments and improvements of the fuel injection device are possible.

DRAWING

The invention is explained in greater detail in the following description with reference to exemplary embodiments illustrated in the drawing, in which:

FIG. 1 shows, a side view of a part of a fuel injection device, partially in section, FIG. 2 shows a view of the fuel injection device in the direction of the arrow II in FIG. 1, FIG. 3 shows a front view of a connecting element between a fuel injection valve and fuel distributor in the fuel injection device in FIGS. 1 and 2, FIG. 4 shows a side view of the connecting element in FIG. 3, FIG. 5 shows a top view of the connecting element in FIG. 3, FIG. 6 shows an identical view as that in FIG. 2 of a fuel injection device according to a further exemplary embodiment with the fuel injection valve removed, FIG. 7 shows a section along the line VII—VII in FIG. 6, FIG. 8 shows a side view of a fuel injection device according to a third exemplary embodiment, FIG. 9 shows a view of the fuel injection device as seen from the arrow IX in FIG. 8, FIG. 10 shows a bottom view of the fuel injection device in FIG. 8 with the fuel injection valve removed, FIG. 11 shows a front view of a connecting element in the fuel injection device according to FIGS. 8–10, FIG. 12 shows a side view of the connecting element in FIG. 11, FIG. 13 shows a top view of the connecting element in FIG. 11.

DESCRIPTION OF THE EXEMPLARY EMBODIMENTS

Figure 1:
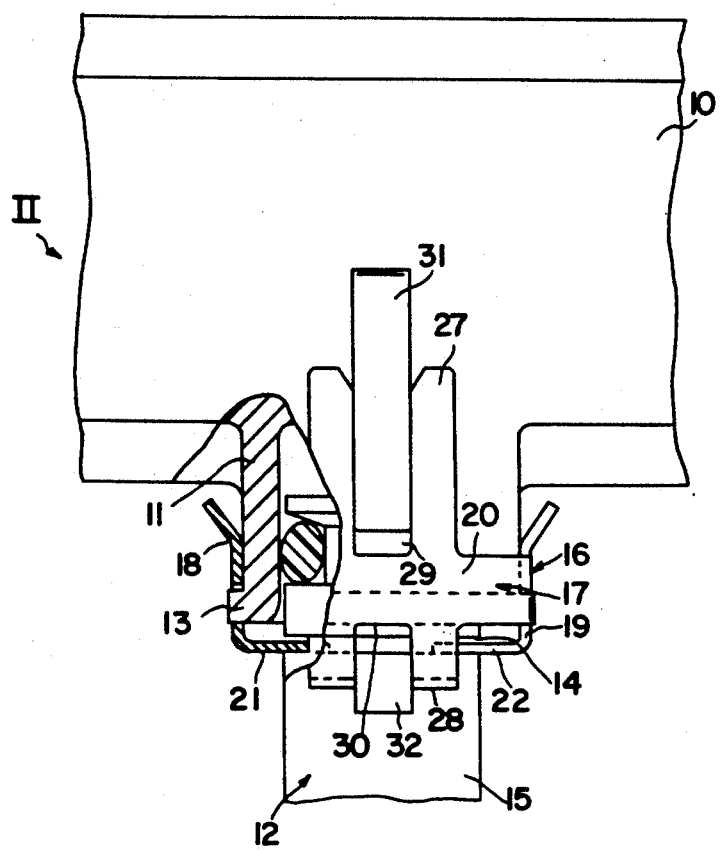
Figure 2:
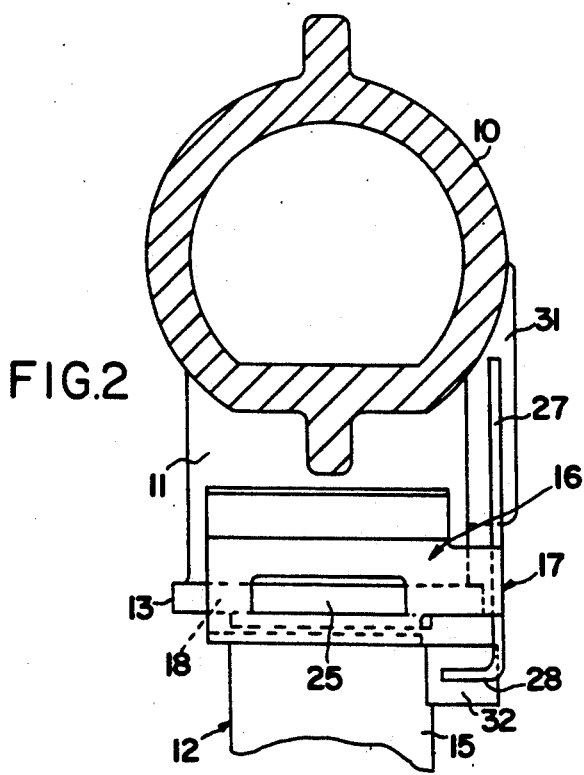

The fuel injection device, parts of which are illustrated partially in section in FIGS. 1 and 2 in two different side views, for internal combustion engines has a fuel distributor 10 made of plastic which bears a multiplicity of connecting pieces 11 and an identical number of fuel injection valves 12 having a connecting opening, present on one end face, for supplying fuel. Such fuel injection valves 12 are generally referred to as top-feed valves. The number of connecting pieces 11 on the fuel distributor 10 and the identical number of fuel injection valves 12 is determined by the number of internal combustion engine cylinders to be supplied. In a four-cylinder internal combustion engine, four fuel injection valves 12 are thus to be provided which are each inserted fluid-tightly into one of four connecting pieces 11 on the fuel distributor 10.

Figure 3:
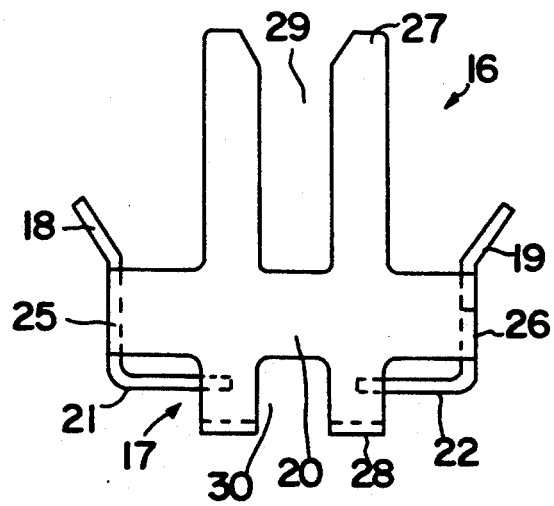
Figure 4:
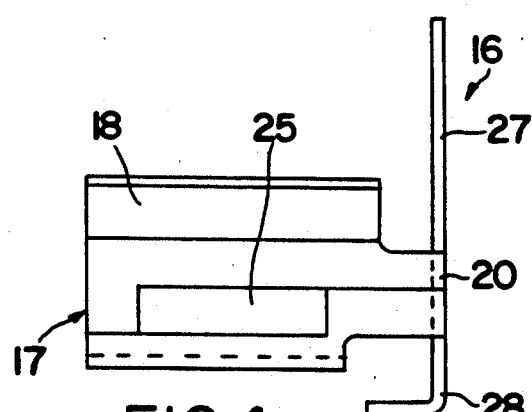
Figure 5:
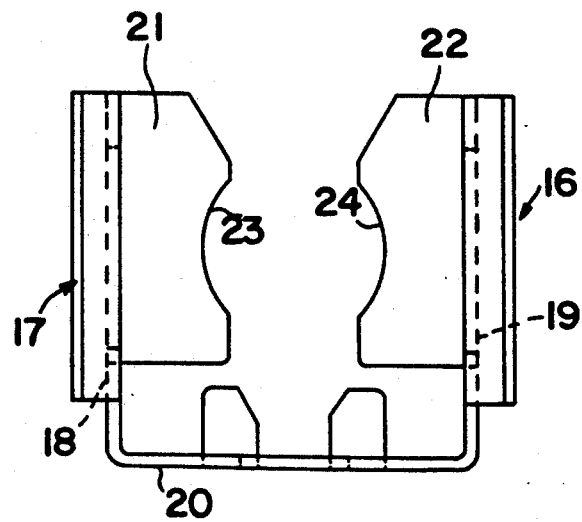

In order to hold the fuel injection valves 12, each connecting piece 11 is provided at the free end face with a radially protruding locking collar 13 and each fuel injection valve 12 is provided with a circumferential groove 14 in its valve housing 15, and for each fuel injection valve 12 a connecting element 16 is provided which engages in the circumferential groove 14 and engages over the locking collar 13. An exemplary embodiment of such a locking collar 16 is illustrated in FIGS. 3–5. It is formed by an approximately U-shaped spring clip 17 which is produced from a piece of punched metal. The spring clip 17 has two spring legs 18, 19 and a spring web 20 connecting the latter. Spring legs 18, 19 and spring web 20 extend in the functional position of the spring clip 17 in each case transversely to the axis of connecting pieces 11 and fuel injection valve 12. From each spring leg 18, 19 an inwardly directed tab 21 or 22 projects approximately at right angles, said tab engaging into the circumferential groove 14 in the valve housing 15 with a contour 23 or 24 matched thereto. As can be seen in particular from FIGS. 3 and 4, the spring legs 18, 19 each have a rectangular opening 25 or 26 extending in the longitudinal direction, the width of which is dimensioned in such a way that the locking collar 13 on the connecting piece 11 can penetrate the openings 25, 26 and thus the spring legs 18, 19 can engage over them on both sides. The spring legs 18, 19 are angled off obliquely towards the outside in their longitudinal edge region pointing towards the connecting piece 11, so that they can be easily pushed, preferably by machine, onto the connecting pieces. From both longitudinal edges of the spring web 20, two sheet metal segments 27, 28 extend transversely to said longitudinal edges of the spring web in opposite directions to one another and approximately parallel to the flush axes of connecting piece 11 and fuel injection valve 12. Each metal sheet segment 27, 28 bears in the centre a longitudinally extending slot 29 or 30 which is open towards the free end, facing away from the spring web 20, of the metal sheet segment 27 or 28. The rectangular metal sheet segment 28 directed towards the fuel injection valve 12 is bent around towards the inside in the end region facing away from the spring web 20.

On the outside on each connecting piece 11 there is an axial rib 31 arranged corresponding with the slots 29, 30, and on the outside on the valve housing 15 of each fuel injection valve 12 a radially projecting cam 32 is arranged. The spring clip 17 which is engaged in the circumferential groove 14 on the valve housing 15 and on the locking collar 13 of the connecting piece 11 engages in a positive-locking manner around the axial rib 31 with the slot 29 in the sheet metal segment 27 and around the cam 32 with the angled-off end of the slot 30 in the sheet metal segment 28 in each case in the circumferential direction. Thus, the spring clip 17 locks the fuel injection valve 12 on the connecting piece 11 both in the axial direction and in the circumferential direction so that without an external expenditure of force it can neither be pulled off in the axial direction nor rotated in the circumferential direction. Axial rib 31 and cam 32 are fastened at a defined position so that after engaging at the induction connecting piece 11 the fuel injection valve 12 constructed as a multi-jet valve is positioned in respect of its jet planes exactly in relation to the induction geometry in the internal combustion engine.

Figure 6:
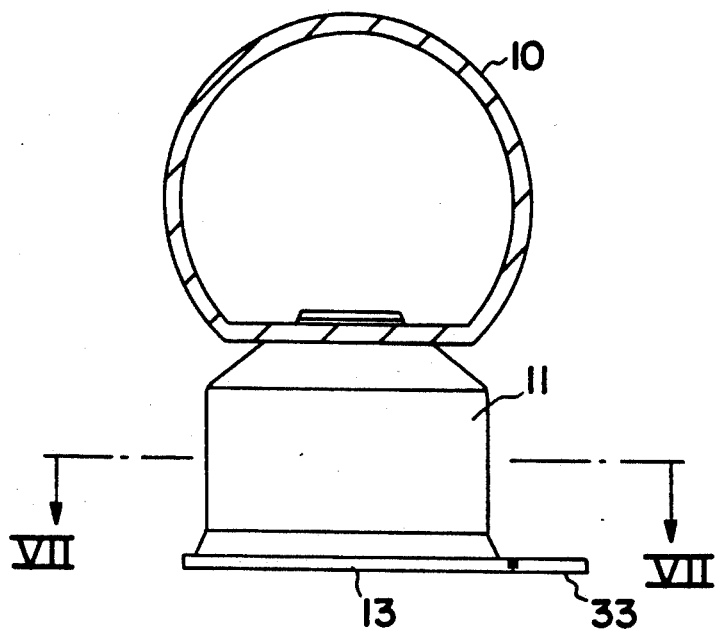
Figure 7:
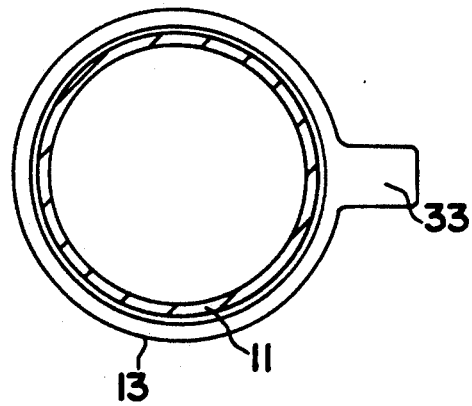

In the fuel injection device illustrated in FIGS. 6 and 7, the connecting piece 11 of the fuel distributor 10 bears, instead of an axial rib, a nose 33 which protrudes radially from the locking collar 13. The spring clip 17 according to FIGS. 3 and 5 engages in its locking position around the nose 33 in a positive-locking manner in the circumferential direction with the slot 29 in the sheet metal segment 27 so that, here too, an additional securing of the fuel injection valve inserted in the connecting piece 11 against rotation in the circumferential direction is provided.

Figure 8:
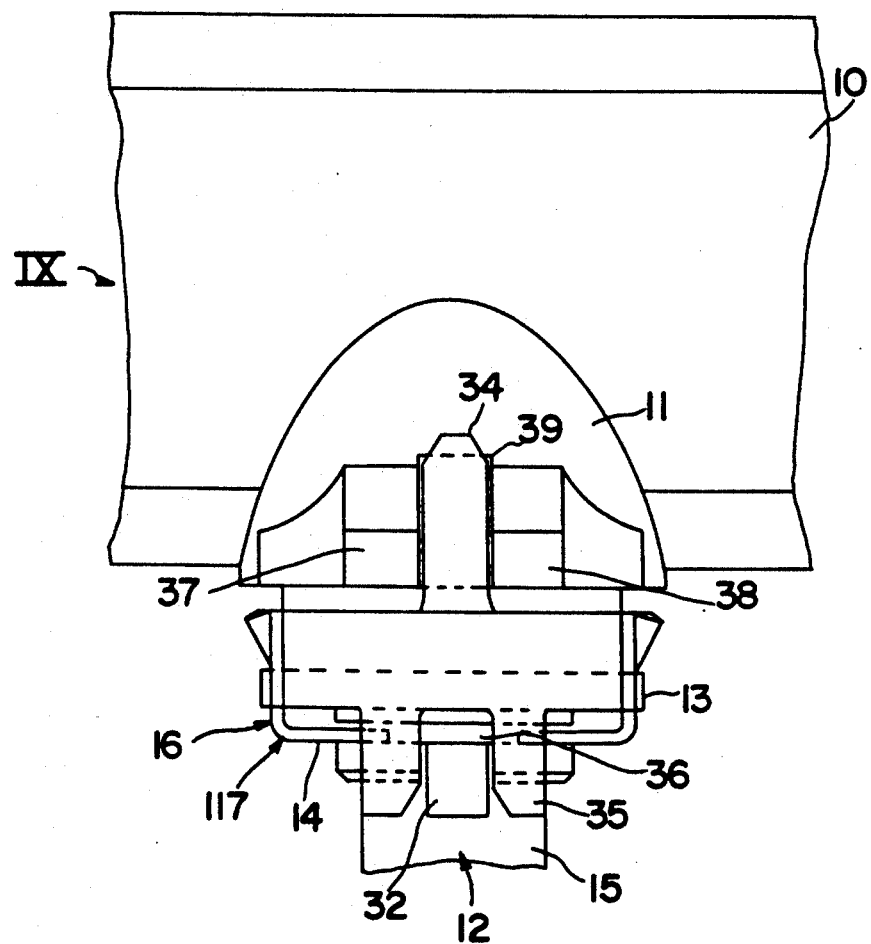
Figure 9:
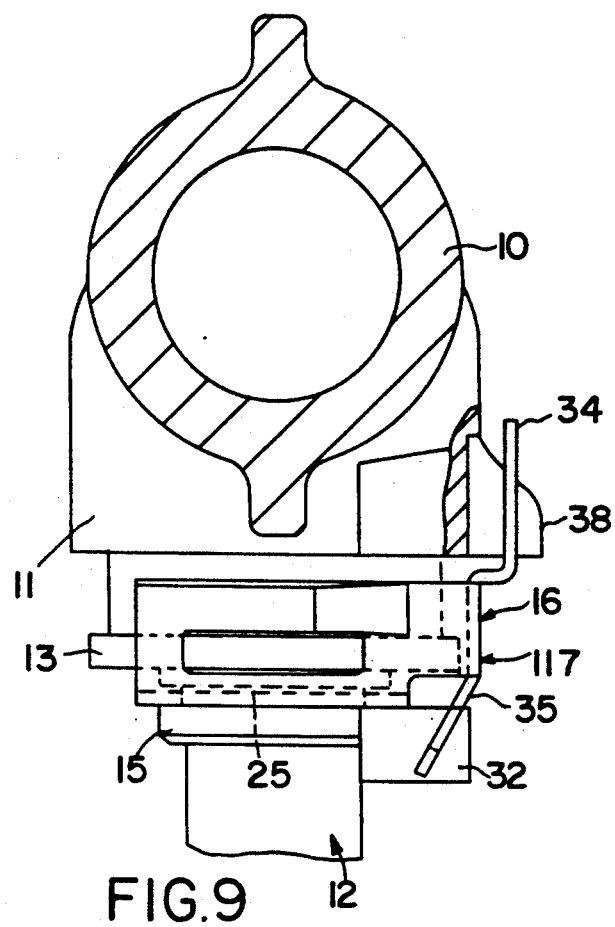
Figure 10:
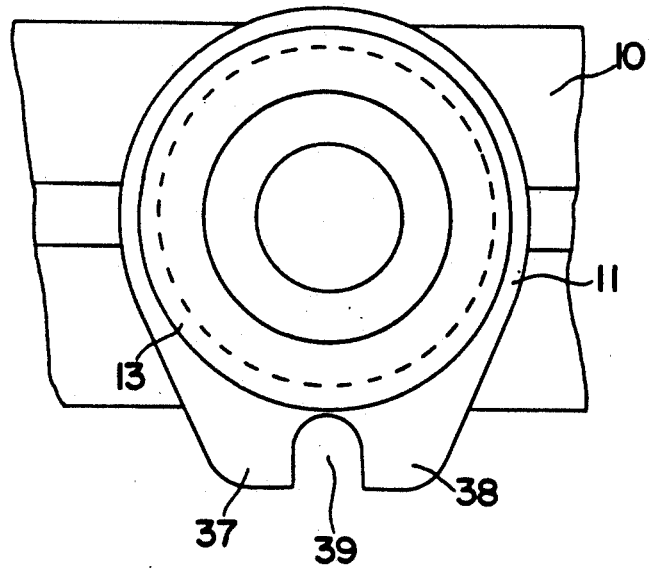
Figure 11:
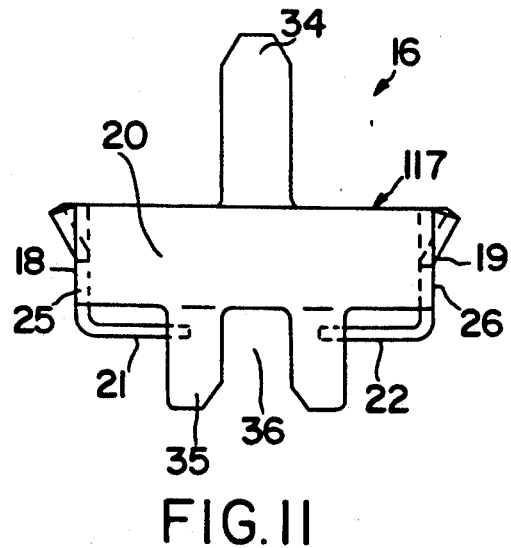
Figure 12:
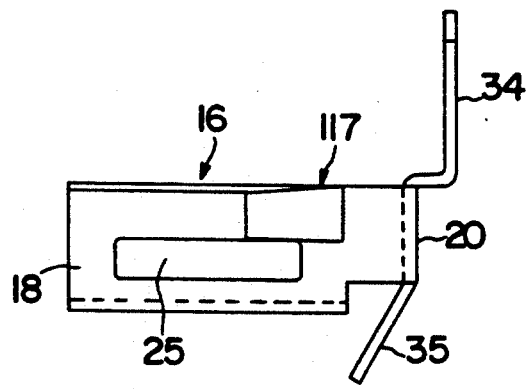
Figure 13:
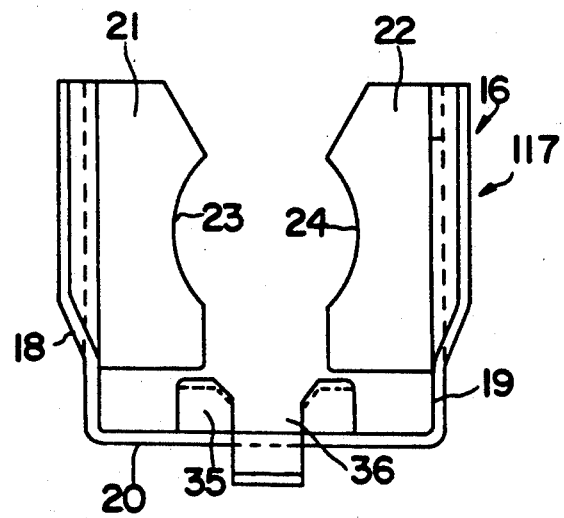

In FIGS. 8–10, a further exemplary embodiment of a fuel injection device is illustrated in which each fuel injection valve 12, inserted into the connecting piece 11 of the fuel distributor 10, is held in an undisplaceable manner in the axial and circumferential direction by means of a connecting element 16 according to Figs. 11–13 which is also constructed as a spring clip 117.

Whereever this fuel injection device corresponds with the fuel injection device illustrated in FIGS. 1–5 identical components are provided with identical reference symbols.

As a fixing element for fixing the fuel injection valve 12 against rotation in the circumferential direction, a tongue 34 extends on the spring clip 117 from the one longitudinal edge of the spring web 20 in the direction of the connecting piece 11 and approximately parallel to its axis, whilst a sheet metal segment 35 departs from the opposite longitudinal edge of the spring web 20 and extends in the direction of the fuel injection valve 20 at an inclined angle in respect of its axis. The sheet metal segment 35 is provided with a slot 36 forming a further fixing element, said slot being open towards the free end of the sheet metal segment 35. On the valve housing 15 of the fuel injection valve 12, a cam 32 is again provided which protrudes radially on the valve housing 15 and around which the slot 36 of the sheet metal segment 35 engages in a positive-locking manner in the circumferential direction. On the connecting piece 11 two projections 37, 38 which extend in parallel to one another protrude in the radial direction, said projections enclosing between them a recess 39 which extends in the axial direction. The tongue 34 on the spring clip 117 engages largely without play in this recess 39 in the circumferential direction. For the purpose of axially locking the fuel injection valve 12 in the connecting piece 11, the spring clip 17 in turn engages, with its openings 25, 26 in the spring legs 18, 19, over the locking collar 13 (FIG. 9).

The invention is not restricted to the described exemplary embodiments. Thus, the fuel distributor 10 can be manufactured from aluminum and the spring clips 17 can also be constructed as injection-moulded plastic components.

We claim:

1. A fuel injection device for internal combustion engines having a fuel distributor which has a multiplicity of connecting pieces including in each case a radially protruding locking collar, a multiplicity of fuel injection valves which are inserted fluid-tightly one each into one connecting piece with their end face containing a connecting opening, a connecting element which engages in a circumferential groove on the valve housing and engages over said locking collar for the purpose of fixing the fuel injection valve on the connecting piece, the valve housing (15) of each fuel injection valve 12 includes at least one first element, applied in a defined position, each of the connecting pieces (11) of said fuel distributor includes at least one second element applied in a defined position, and the connecting element (16) includes a first holding element (29, 34) and a second holding element, (36) that engage with one of said at least one first element and said at least one second element, said first and second fixing elements being arranged in such a way that when the fuel injection valve (12) is fixed to the connecting piece (11), said fuel injection valve assumes a predetermined position.

2. A fuel injection device according to claim 1, in which the at least one second element on the connecting piece (11) and the at least one first element on the valve housing (15) are constructed as webs, cams or ribs (31, 32) extending essentially in an axial direction and protruding radially from the connecting piece (11) or from the valve housing (15), , and the first and second fixing elements on the connecting element (16) are constructed as slots (29, 30) extending essentially in the axial direction and open at end sides facing away from one another.

3. A fuel injection device according to claim 1, in which said first fixing element on the connecting element (16) is constructed as a tongue (34) extending in the axial direction and said second fixing element is constructed as a slot (36) extending in the axial direction and open on the end side, and said at least one second element on the connecting piece (11) corresponding to the tongue (34) is formed from a recess (39) delimited by two radial projections (37, 38), and said at least one first element on the valve housing (15) is formed by a radially projecting cam (32) which corresponds to the other slot (36).

4. A fuel injection device according to claim 1, in which the at least one second element on the connecting piece (11) is constructed as a nose (33) protruding radially from the locking collar (13) and the at least one first element on the valve housing (15) is constructed as a cam (32) extending radially in the axial direction and protruding radially on the valve housing (15), and the first and second fixing elements on the connecting element (16) are constructed as slots (29, 30) extending in the axial direction and open at end sides facing away from one another.

5. A fuel injection device according to claim 1, in which the connecting element (16) is constructing as a U-shaped spring clip (17; 117) having two spring legs (18, 19) and a spring web (20) connecting the two spring legs and running transversely to the axis of the valve housing (15) and fuel injection valve (12), a tab (21, 22) directed towards an inside sticks out from each spring leg (18, 19) approximately at right angles, said tab engaging in the annular groove (14) in the valve housing (15) with a contour (23, 24) matched to said annular groove, the spring legs (18, 19) each has one opening (25, 26) extending in the longitudinal direction for penetrating the locking collar (13) on the connecting piece (11) and the first and second fixing elements (31, 32; 33; 39) extend transversely to the spring web (20) approximately in the web centre and flush with one another.

6. Device according to claim 5, characterized in that the spring legs (18, 19) are angled off obliquely towards the outside in their longitudinal edge region pointing towards the connecting piece (11).

7. A fuel injection device according to claim 5, in which the spring clip (17; 117) is produced from a sheet metal part or constructed as a plastic injection moulded part.

8. A fuel injection device according to claim 2, in which the connecting element (16) is constructing as a U-shaped spring clip (17; 117) having two spring legs (18, 19) and a spring web (20) connecting the two spring legs and running transversely to the axis of the valve housing (15) and fuel injection valve (12), a tab (21, 22) directed towards an inside sticks out from each spring leg (18, 19) approximately at right angles, said tab engaging in the annular groove (14) in the valve housing (15) with a contour (23, 24) matched to said annular groove, the spring legs (18, 19) each has one opening (25, 26) extending in the longitudinal direction for penetrating the locking collar (13) on the connecting piece (11) and the first and second fixing elements (31, 32; 33; 39) extend transversely to the spring web (20) approximately in the web centre and flush with one another.

9. A fuel injection device according to claim 3, in which the connecting element (16) is constructing as a U-shaped spring clip (17; 117) having two spring legs (18, 19) and a spring web (20) connecting the two spring legs and running transversely to the axis of the valve housing (15) and fuel injection valve (12), a tab (21, 22) directed towards an inside sticks out from each spring leg (18, 19) approximately at right angles, said tab engaging in the annular groove (14) in the valve housing (15) with a contour (23, 24) matched to said annular groove, the spring legs (18, 19) each has one opening (25, 26) extending in the longitudinal direction for penetrating the locking collar (13) on the connecting piece (11) and the first and second fixing elements (31, 32; 33; 39) extend transversely to the spring web (20) approximately in the web centre and flush with one another.

10. A fuel injection device according to claim 4, in which the connecting element (16) is constructing as a U-shaped spring clip (17; 117) having two spring legs (18, 19) and a spring web (20) connecting the two spring legs and running transversely to the axis of the valve housing (15) and fuel injection valve (12), a tab (21, 22) directed towards an inside sticks out from each spring leg (18, 19) approximately at right angles, said tab engaging in the annular groove (14) in the valve housing (15) with a contour (23, 24) matched to said annular groove, in that the spring legs (18, 19) each has one opening (25, 26) extending in the longitudinal direction for penetrating the locking collar (13) on the connecting piece (11) and the first and second fixing elements (31, 32; 33; 39) extend transversely to the spring web (20) approximately in the web centre and flush with one another.

11. A fuel injection device according to claim 8, in which the two spring legs (18, 19) are angled off obliquely towards an outside in their longitudinal edge region pointing towards the connecting piece (11).

12. A fuel injection device according to claim 9, in which the two spring legs (18, 19) are angled off obliquely towards an outside in their longitudinal edge region pointing towards the connecting piece (11).

13. A fuel injection device according to claim 10, in which the two spring legs (18, 19) are angled off obliquely towards an outside in their longitudinal edge region pointing towards the connecting piece (11).

14. A fuel injection device according to claim 8, in which the two spring clips (17; 117) are produced from a sheet metal part or constructed as a plastic injection moulded part.

15. A fuel injection device according to claim 9, in which the two spring clips (17; 117) are produced from a sheet metal part or constructed as a plastic injection moulded part.

16. A fuel injection device according to claim 10, in which the two spring clips (17; 117) are produced from a sheet metal part or constructed as a plastic injection moulded part.

17. A fuel injection device according to claim 6, in which the two spring clips (17; 117) are produced from a sheet metal part or constructed as a plastic injection moulded part.

18. A fuel injection device according to claim 11, in which the two spring clips (17; 117) are produced from a sheet metal part or constructed as a plastic injection moulded part.

19. A fuel injection device according to claim 12, in which the two spring clips (17; 117) are produced from a sheet metal part or constructed as a plastic injection moulded part.

20. A fuel injection device according to claim 13, in which the two spring clips (17; 117) are produced from a sheet metal part or constructed as a plastic injection moulded part.

* * * * *